United States Patent [19]

Okamura et al.

[11] 4,371,286
[45] Feb. 1, 1983

[54] TAPPING BOSS OF MAGNETIC TAPE CASSETTE

[75] Inventors: Masatoshi Okamura; Haruo Shiba, both of Tokyo, Japan

[73] Assignee: TDK Electronics Co., Ltd., Tokyo, Japan

[21] Appl. No.: 285,291

[22] Filed: Jul. 20, 1981

[51] Int. Cl.³ .................. B25G 3/00; F16D 2/14; F16B 21/80; F16G 11/00
[52] U.S. Cl. ........................... 403/407; 403/344
[58] Field of Search .............. 403/407, 344; D14/6, D14/11; 360/132; 220/4 B, 21; 206/387, 444

[56] References Cited

U.S. PATENT DOCUMENTS

| | | | |
|---|---|---|---|
| 2,668,021 | 2/1954 | Gleason | 360/132 |
| 3,302,813 | 2/1967 | Schaich | 220/4 B |
| 3,676,898 | 7/1972 | Roch | 403/407 X |
| 4,217,614 | 8/1980 | Balson | 360/132 |
| 4,235,334 | 2/1981 | Ahn et al. | 206/387 |
| 4,274,545 | 6/1981 | Peroni | 220/4 R |
| 4,335,909 | 6/1982 | Schmitz . | |
| 4,337,909 | 7/1982 | Harja | 360/132 |

Primary Examiner—Wayne L. Shedd
Attorney, Agent, or Firm—Oblon, Fisher, Spivak, McClelland & Maier

[57] ABSTRACT

A tapping boss formed in one piece with the upper half casing for joining the lower half casing of a magnetic tape cassette comprises a stem having a cross sectional area slightly larger than the diameter of a tapping screw to receive the screw and a plurality of ribs which project radially from the cylindrical surface of said stem and whose top portions provide contact shoulders for the boss supporter of a lower half casing.

4 Claims, 4 Drawing Figures

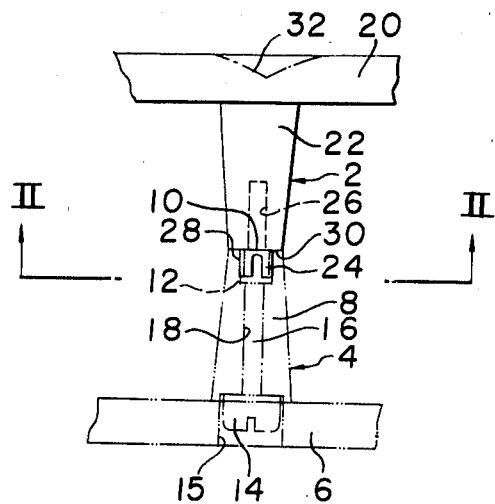
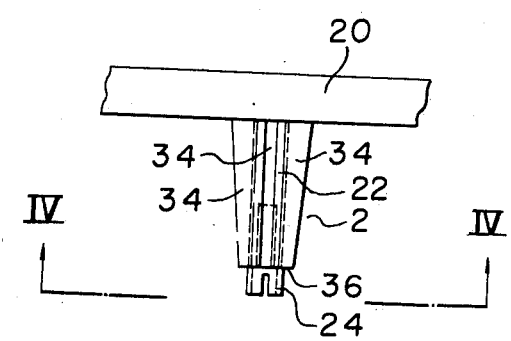
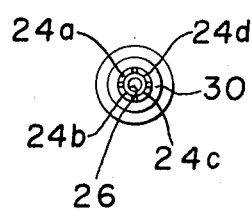
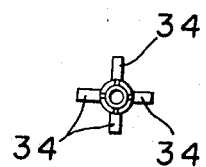

TAPPING BOSS OF MAGNETIC TAPE CASSETTE

BACKGROUND OF THE INVENTION

1. Field of the Invention

The present invention relates generally to a magnetic tape cassette. More particularly, it relates to a tapping boss of the upper half casing of a magnetic tape cassette which is formed by fastening the upper half casing and a lower half casing by tapping screws.

2. Description of the Prior Arts

A magnetic tape cassette or a cartridge for a video tape generally comprises a pair of upper and lower half casings in which a magnetic recording tape wound around hubs is held. It is, therefore, necessary to fasten the upper and lower half casings by tapping screws after both the casings are coupled. For this, tapping bosses for receiving the screws and the corresponding number of boss supporters brought into contact with the tapping bosses are set up from the base plate of respective upper and lower half casings at each corner and other suitable positions.

FIG. 1 shows a tapping boss (2) of the upper half casing of the conventional magnetic tape cassette for video tape by a solid line and a boss supporter (4) of the lower half casing which is brought into contact with the end of the tapping boss (2) by a imaginary line.

The boss supporter (4) of the lower half casing comprises a holder (8) of a cylindrical body having a gradually reduced end which is formed on the base plate (6) of the lower half casing. A recess (12) is formed at the top end (10) of the holder (8) and a through hole (18) is formed between the recess (12) and a counter sinking cavity (15) formed in the outer surface of the base plate (6) to receive the head (14) of the tapping screw so that the body portion (16) of the tapping screw is inserted through the hole (18).

The tapping boss of the upper half casing comprises a stem (22) of a cylindrical body having a gradually reduced end which is formed on the base plate (20) of the upper half casing in one piece and a resilient projection (24) which projects from the top of the stem (22) and is capable of snapping engagement with the recess (12) of the holder (8) of the lower half casing thereby determining positions of the upper and lower half casings. A threaded hole (26) is formed in the stem so as to engage with the body portion (16) of the tapping screw. The resilient projection (24) comprises four thin pieces (24a) to (24d) which are formed by dividing a thin-walled tubular body surrounding the threaded hole (26) into four parts and each thin piece is resiliently deformable inwards. The resilient projection (24) has an outer diameter slightly greater than the inner diameter of the recess (12) of the holder (8) so that when the upper and lower half casings are assembled, the top end of the projection comes into contact with a chamfered edge of the recess (12) and then is snap-fitted into the recess by resilient deformation. An annular surface region on the top of the stem from which the resilient projection projects provides a shoulder (30) brought into contact with the top (10) of the boss supporter of the lower half casing.

In the conventional magnetic tape cassette, the chamfered portion (28) formed around the edge of the recess (12) of the boss supporter (8) ensures easy insertion of the resilient projection; however, this requires for the top of the tapping boss (2) an annular region, i.e. a contact shoulder (30) which should be out of the chamfered portion (28). It is, therefore, necessary for the stem (22) to form a cylindrical body having a gradually reduced end which should have the thickness required to receive the tapping screw. This configuration often causes a large shrinking recess (32) on the outer surface of the base plate (20) at the point to which the root of the stem (22), not having a reduced thickness such as that of the counter sinking hole (16) of the lower half casing is connected. The large shrinking recess (32) causes problems in that accuracy of shape of the magnetic tape cassette such as parallelism and flatness is greatly reduced and appearance is inferior.

One attempt to overcome the problem of the shrinking recess is to reduce the diameter of the stem of the tapping boss (2). However, there is an disadvantage in that the surface area of the contact shoulder (30) is reduced resulting in insufficient support of the holder (4) to the tapping boss (2).

SUMMARY OF THE INVENTION

It is an object of the present invention to provide a novel structure of the tapping boss of a magnetic tape cassette which prevents the occurrence of a shrinking recess when molded, thereby providing an excellent appearance and does not cause reduction of accuracy in shape such as parallelism and flatness after assembling.

The foregoing and other objects of the present invention have been attained by providing a tapping boss formed in one piece with the upper half casing for joining the lower half casing of a magnetic tape cassette, in which a stem having a cross sectional area slightly larger than the diameter of a tapping screw to receive the screw and a plurality of ribs which project radially from the cylindrical surface of said stem and whose top portions provide contact shoulders for the boss supporter of a lower half casing are provided.

BRIEF DESCRIPTION OF THE DRAWINGS

FIG. 1 is a front view of the conventional tapping boss of a magnetic tape cassette;

FIG. 2 is a cross sectional view taken along line II—II of FIG. 1;

FIG. 3 is a front view of an embodiment of the tapping boss of the present invention; and FIG. 4 is a cross sectional view taken along line IV—IV of FIG. 3.

DETAILED DESCRIPTION OF THE PREFERRED EMBODIMENTS

An embodiment of the present invention will be described with reference to FIGS. 3 and 4.

A tapping boss (2) is formed in one piece with a base plate (20) of the upper half casing of a magnetic tape cassette and comprises a stem (22), a resilient projection (24) projecting from the top of the stem and a plurality of ribs (34) around the outer surface and along the longitudinal direction of the stem (22). The stem (22) has a wall thickness sufficient to receive, into the threaded hole, a tapping screw whose diameter is substantially the same as that of the resilient projection (24). The number of ribs (34) can be determined as desired even though there are four ribs in this embodiment. The ribs are formed equidistant from each other and in one piece with the stem. The shape of the ribs should be the same and the outer edge line of the ribs can be parallel to the outer surface of the cylindrical stem. However, it is preferable to form the ribs so that the width is gradually increased from the top of the stem to the bottom (the root of the stem) whereby the flow of resin in the molding can be improved. The top ends (36) of the ribs (34) provide the contact shoulder against the holder (4).

With this structure, the wall thickness of the tapping boss, especially at connecting portion of the boss to the base plate, can be reduced and the difference of wall thickness between the tapping boss and the base plate is reduced to prevent occurrence of shrinking recess. The height of the contact shoulder (36) can be determined as desired depending upon the length of the ribs (34) and contact of the ribs with the holder is satisfactorily attained. Accordingly, the chamfered portion (28) of the recess (12) for receiving the resilient projection (24) can be made large thereby providing easy assembling.

We claim:

1. In a tapping boss formed in one piece with the upper half casing for joining the lower half casing of a magnetic tape cassette, an improvement which comprises a stem having a cross sectional area slightly larger than the diameter of a tapping screw to receive the screw and a plurality of ribs which project radially from the cylindrical surface of said stem and whose top portions provide contact shoulders for the boss supporter of a lower half casing.

2. A tapping boss according to claim 1 wherein said ribs are provided around said stem at equidistant positions.

3. A tapping boss according to claim 1 or 2 wherein four ribs are provided.

4. A tapping boss according to claim 1 wherein the width of said ribs are gradually increased from the top to the bottom.

* * * * *

UNITED STATES PATENT AND TRADEMARK OFFICE
CERTIFICATE OF CORRECTION

PATENT NO. : 4,371,286

DATED : February 1, 1983

INVENTOR(S) : Masatoshi Okamura et al.

It is certified that error appears in the above-identified patent and that said Letters Patent is hereby corrected as shown below:

On the title page the following should be added:

-- [30]   Foreign Application Priority Data

August 4, 1980   [JP] Japan.....109778/1980 --

Signed and Sealed this

Tenth Day of April 1984

[SEAL]

Attest:

GERALD J. MOSSINGHOFF

Attesting Officer          Commissioner of Patents and Trademarks